US011921616B1

(12) United States Patent
Xiang et al.

(10) Patent No.: US 11,921,616 B1
(45) Date of Patent: Mar. 5, 2024

(54) RETAINING DAFNY SPECIFICATIONS

(71) Applicant: Amazon Technologies, Inc., Seattle, WA (US)

(72) Inventors: Tongtong Xiang, Seattle, WA (US); Sean Mclaughlin, Seattle, WA (US); Marianna Rapoport, Toronto (CA); Neha Rungta, San Jose, CA (US); Matthias Schlaipfer, Berlin (DE); Florian Rabe, Erlangen (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/707,861

(22) Filed: Mar. 29, 2022

(51) Int. Cl.
G06F 11/36 (2006.01)
G06F 8/35 (2018.01)
G06F 8/41 (2018.01)
G06F 9/445 (2018.01)

(52) U.S. Cl.
CPC ............ G06F 11/3628 (2013.01); G06F 8/35 (2013.01); G06F 8/447 (2013.01); G06F 9/44589 (2013.01)

(58) Field of Classification Search
None
See application file for complete search history.

(56) References Cited

U.S. PATENT DOCUMENTS 7,281,237 B2 * 10/2007 de Jong .............. G06F 9/44589 717/126
9,536,093 B2 * 1/2017 Hawblitzel ............... G06F 8/41
2004/0143814 A1 * 7/2004 de Jong .............. G06F 9/44589 717/114
2004/0177347 A1 * 9/2004 Dwyer ................ G06F 11/3624 717/124
2010/0146494 A1 * 6/2010 Gellerich .................. G06F 8/37 717/143
2013/0185697 A1 * 7/2013 Farchi ....................... G06F 8/71 717/113
2017/0168786 A1 * 6/2017 Beckey ..................... G06F 8/30
2020/0073783 A1 * 3/2020 Hortala ..................... G06F 9/54
2020/0319863 A1 * 10/2020 Lextrait .................. G06F 8/436

FOREIGN PATENT DOCUMENTS

| GB | 2602680 A | * | 7/2022 | ............ G06F 21/14 |
| WO | WO-0118649 A2 | * | 3/2001 | ............... G06F 8/41 |
| WO | WO-2014072209 A1 | * | 5/2014 | ............ G06F 21/14 |

OTHER PUBLICATIONS

Checker framework, "The Checker Framework Manual: Custom Pluggable Types for Java", Checker Framework, checkerframework.org, Apr. 1, 2022, URL: https://checkerframework.org/manual/, 306 pages.

* cited by examiner

*Primary Examiner* — Philip Wang
(74) *Attorney, Agent, or Firm* — Athorus, PLLC

(57) ABSTRACT

Disclosed are systems and methods that determine specification portions of Dafny code and transform those specifications into one or more annotations, expressions, comments, and/or assertions that are included in a destination code written in a destination language as part of a compilation of the Dafny code into the destination code. The annotations, expressions, comments, and/or assertions in the destination code may be utilized by a verification component, such as a Checker Framework, to detect errors that are introduced into the destination code by the compiler as part of the compilation or to verify the absence of errors in the destination code.

23 Claims, 6 Drawing Sheets

DAFNY CODE

```
module Option {
  datatype T<U> = Some(x: U) | None
}
// Model of a java.util.Map
module {:extern} Map {
  import opened Option
  datatype T = Map(x: map<string, Option.T<string>>){
    function method {:extern} get(key: string): Option.T<string>
  }
}
// Model of a java.lang.String
module {:extern} String {
  function method {:extern} toUpperCase(s: string): string
}
module Test {
  import opened Map
  import opened Option
  import opened String
  method foo(input: Map.T) {
    var v := input.get("abc");
    match v {
      case Some(val) => print String.toUpperCase(val);
      case None => print "Got null from input at \"abc\" ";
    }
  }
}
```

FIG. 3

JAVA COMPILATION - INCORRECT — 407
```
public static void foo(Map<String, String> input) {
   String v = input.get("abc");            — 403
   System.out.println(v.toUpperCase());
}
```
410

FIG. 4

JAVA COMPILATION - INCORRECT WITH ANNOTATION — 507
```
public static void foo(Map<String, @Nullable String> input) {
   @Nullable String v = input.get("abc");   — 503
   System.out.println(v.toUpperCase());
}
```
510

FIG. 5

JAVA COMPILATION - CORRECT WITH ANNOTATIONS — 607
```
public static void foo(Map<String, @Nullable String> input) {
   @Nullable String v = input.get("abc");   — 603
   if (v != null) {
      System.out.println(v.toUpperCase());    ← 605
   } else {
      System.out.println(v.toUpperCase());
   }
}
```
610

DAFNY CODE

```
method getValueMethod(key: string, context: map<string, bool>) returns (reg: bool)
    requires key in context        — 701
{
    return context[key];
}
```
— 720

FIG. 8

JAVA COMPILATION - WITHOUT ANNOTATION

```
static boolean getValue(String key, Map<String, Boolean> context) {
    return context.get(key);   — 803
}
```

FIG. 9

JAVA COMPILATION - WITH ANNOTATION

```
static boolean getValue(String key, Map<String, Boolean> context) {
    assert context.get(key) != null : "@AssumeAssertion(nullness)";   — 903
    return context.get(key);
}
```
905-1 , 905-2

RETAINING DAFNY SPECIFICATIONS

BACKGROUND

Dafny is a computer programming language with a built-in static program verifier. Developing programs in Dafny allows developers to prove the absence of errors, such as null-pointer errors, out-of-bound exceptions, and non-terminating loops. For example, developers can include specifications in the Dafny code that state one or more assertions, invariants, pre-conditions, and/or post-conditions. However, when compiling Dafny code into a code written in the destination program language, such as Java, the information indicated in the specifications is lost. As a result, there is currently no way to ensure that the compiler, in compiling the Dafny code into code written in the destination program language, has not introduced an error into the code written in the destination programming language.

BRIEF DESCRIPTION OF THE FIGURES

FIG. 3 is an example code written in the Dafny programming language.

FIG. 4 is an example code in a destination programming language resultant from an incorrect compilation of the Dafny code of FIG. 3.

FIG. 5 is an example code in the destination programming language with annotations compiled from types of the Dafny code of FIG. 3, in accordance with disclosed implementations.

FIG. 6 is another example code in the destination programming language with annotations compiled from the types of the Dafny code of FIG. 3, in accordance with the disclosed implementations.

FIG. 7 is another example code written in the Dafny programming language.

FIG. 8 is an example code in a destination programming language resultant from a traditional compilation of the Dafny code of FIG. 7.

FIG. 9 is another example code in the destination programming language with annotations compiled from the specifications of the Dafny code of FIG. 7, in accordance with the disclosed implementations.

DETAILED DESCRIPTION

Disclosed are systems and methods that determine specification portions of Dafny code ("Dafny code") and compile those specifications into annotations, expressions, comments, and/or assertions that are included in a code written in a destination language ("destination code") as part of a compilation of the Dafny code into the destination code. A "specification" of the Dafny code that may be compiled into annotations, assertions, comments, and/or expressions in a destination programming language may include types, specifications, and/or any other portion of Dafny code that is not compilable into executable code in the destination programming language. Accordingly, a specification may include a pre-condition, a post-condition, an invariant, an assertion, or a type. The annotations, assertions, comments, and/or expressions in the destination code may be utilized by a verification component, such as a Checker Framework, Open Java Modeling Component ("OpenJML"), a SpotBugs component, etc., to detect errors that are introduced into the destination code by the compiler as part of the compilation or verify the absence of errors in the destination code.

While the discussion herein refers to the compilation of Dafny specifications into annotations in a destination programming language, it will be understood the disclosed implementations may also be utilized to compile Dafny specifications into assertions, expressions, comments, or any combination of annotations, assertions, comments, and expressions in a destination programming language. The use of annotations throughout the specification is to simplify discussions and is not to be considered as limiting.

As discussed further below, annotations provide extra information about types, such as knowing whether or not the type can be nullable to prevent null-pointer error, or determining all possible values of a variable to prevent out-of-bound exceptions. These annotations provide idiomatic code that includes more information and readability to the generated destination code when viewed by a human developer and also provide an automated way for a verification component to verify the destination code. For example, the annotations may be used by a verification component to verify whether a null-pointer error exists in the destination code, whether a constant value error exists in the destination code, whether an arithmetic overflow error exists in the destination code, whether an out-of-bounds error exists in the destination code, whether unsafe signedness operations exist in the destination code, whether unsafe downcasting operations exist in the destination code, whether security errors exist in the destination code, whether an invalid regular expressions exist in the destination code, etc.

Figure 1:
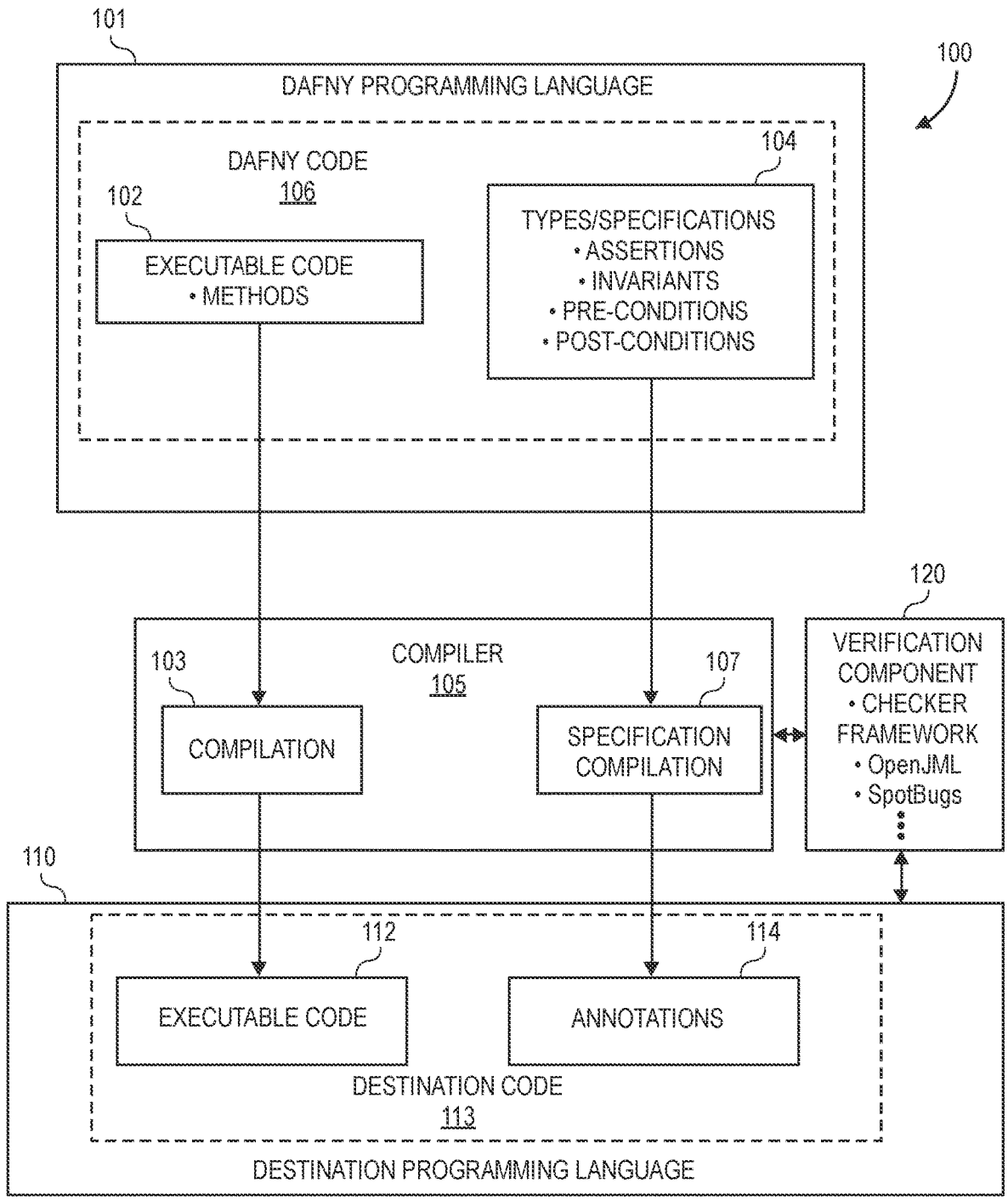
FIG. 1 is a block diagram of an environment for compiling code written in a Dafny programming language to code written in a destination programming language, with Dafny specifications being compiled into annotations in the destination programming language, in accordance with disclosed implementations.

FIG. 1 is a block diagram of an environment 100 for compiling Dafny code 106 written in the Dafny programming language 101 to a destination code 113 written in a destination programming language 110, with Dafny specifications 104 being compiled into annotations 114, in accordance with disclosed implementations.

Like many programming languages, Dafny code 106 includes methods, variables, types, loops, if statements, arrays, integers, etc. A method is a piece of imperative, executable code 102 and the body of the method is code contained within braces. As with all code, the body includes a series of statements, such as imperative assignments, if statements, loops, etc. While such methods are common among programming languages, Dafny diverges from other languages with the use of types/specifications 104, collectively referred to herein as specifications. Specifications provide a developer the ability to specify, in a more natural language, the intent of a method with a combination of assertions, invariants, pre-conditions, and post-conditions. Dafny uses those specifications to verify that the method executes as intended by the developer.

Rather than discard specifications 104 included in the Dafny code 106 when compiling the Dafny code 106 into a destination code 113 written in a destination programing language 110, as is done by existing compilers, the disclosed implementations identify the specifications 104 and convert those specifications 104 into annotations 114 that are included in the destination code 113 and usable by a verification component 120 to verify the destination code 113.

For example, and in accordance with the disclosed implementations, when compiling 103 Dafny code 106, using a compiler 105, into destination code 113 written in a destination programming language 110, such as Java, rather than discarding the specifications 104 included in the Dafny code 106, additional analysis may be performed. In some implementations, the compiler 105 may be extended to include a specification compilation component 107 that detects the specification(s) 104 included in the Dafny code 106 and compiles those specifications 104 into annotations 114 that may be included in the destination code 113 along with the executable code 112. For example, the specification compilation component 107 may understand the Dafny programming language 101, the destination programming language 110, and a verification component 120, such as a Checker Framework, OpenJML, SpotBugs, etc., that interfaces with the compiler 105 to verify the resultant destination code. Utilizing that understanding of the Dafny programming language 101, the destination programming language 110, and the verification component 120, the specification compilation component 107, as discussed further below, may identify specifications in the Dafny programming language 101 and compile those specifications into annotations 114, expressions and/or assertions, that are included in the destination code 113 and that are usable by the verification component 120.

While the example illustrated in FIG. 1 indicates that the specification compilation component 107 that compiles the specification(s) 104 from the Dafny code 106 to annotations 114 in the destination code 113 is an extension of the compiler 105, in other implementations the specification compilation component 107 may be separate and/or independent of the compiler 105. For example, the compiler 105 may process the executable code within the Dafny code 106 to generate the executable code 112 within the destination code 113 and the specification compilation component 107 may further process the Dafny code 106 to identify and compile specifications 104 of the Dafny code 106 into annotations 114 that are included in the destination code 113.

By retaining information included in the specification(s) 104 of the Dafny code 106 as annotations 114 in the destination code 113, the verification component 120 is able to utilize those annotations to determine, at compile time, the presence of an error in the destination code 113 that was introduced by the compiler 105 or verify the absence of the error from the destination code 113. As a result, the disclosed implementations provide a technical improvement of improving the operation of a computing system by enabling the ability to verify the accuracy of compiled code that is compiled from the Dafny programming language 101 to a destination programming language 110 at compile time so that the destination code 113 does not fail at runtime.

Figure 2:
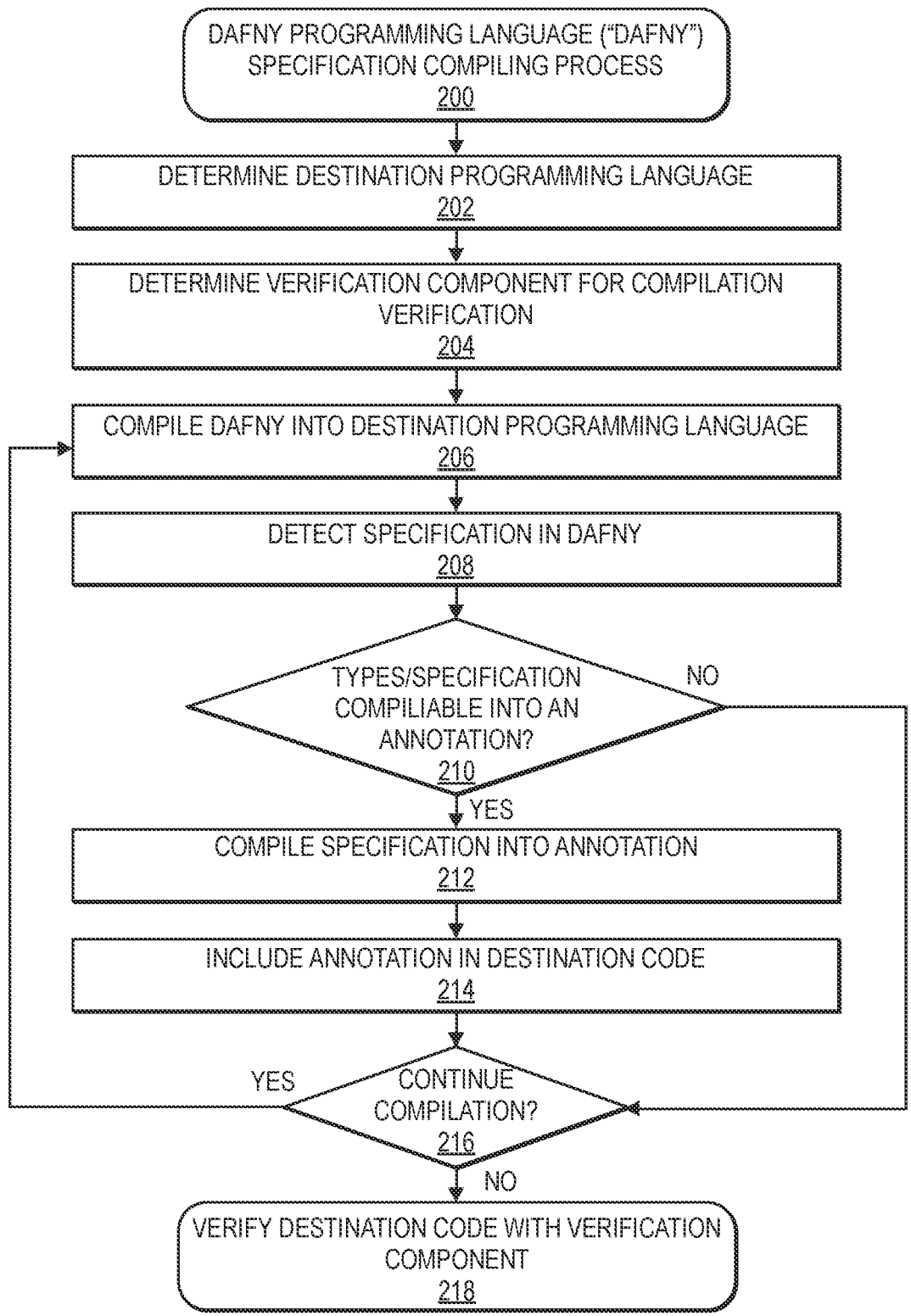
FIG. 2 is an example Dafny programming language specification compiling process, in accordance with disclosed implementations.

FIG. 2 is an example Dafny programming language specification compilation process 200, in accordance with disclosed implementations.

The example process 200 begins by determining a destination programming language to which the Dafny code is to be compiled, as in 202. Any of a variety of programming languages may be the destination programming language. For example, the destination programming language may be, but is not limited to, Java, .NET, Go, JavaScript, C#, etc.

In addition to determining the destination programming language, the verification component that will be used to verify the compiled destination code is also determined, as in 204. As is known, verification components, or compiler plug-ins, such as Checker Framework, OpenJML, SpotBugs, etc., may be used during programming at compile time to check code for errors or to verify the absence of errors. For example, Checker Framework may process annotations in Java code to determine if a null-pointer error exists in the code or to verify that a null-pointer error does not exist in the code, to determine if a constant value error exists in the code or to verify that a constant value error does not exist in the code, to determine if an arithmetic overflow error exists in the code or to verify that an arithmetic overflow error does not exist in the code, to determine if an out-of-bounds error exists in the code or to verify that an out-of-bounds error does not exist in the code, to determine if an unsafe signedness operation exists in the code or to verify that an unsafe signedness operation does not exist in the code, to determine if a security error exists in the code or to verify that a security error does not exist in the code, to determine if an invalid regular expression exists in the code or to verify that an invalid regular expression does not exist in the code, etc.

Dafny code may then be compiled into the destination programming language, as in 206. As part of the compilation, the Dafny code is also processed to detect a specification included in the Dafny code, as in 208. For example, the example process 200 may process the abstract syntax tree ("AST") of the Dafny code to determine portions of the Dafny code that are specifications. For example, the AST may be processed to identify particular terms (e.g., requires, ensures, invariant, etc.), symbols, phrases, etc., that correspond to or otherwise identify specifications in the Dafny code.

Upon detection of a specification included in the Dafny code, a determination is made as to whether the specification is compilable into an annotation that can be included in the destination code and usable by the verification component, as in 210. In some examples, not all specifications may be compilable into an annotation, expression, comment, and/or assertion. In other implementations, all specifications of a Dafny code may be compiled into annotations, expressions, comments, and/or assertions.

If it is determined that the specification is compilable into an annotation, expression, comment, and/or assertion, the specification is compiled into an annotation, expression, comment, and/or assertion that can be utilized by the verification component to verify the destination code, as in 212, and the annotation, expression, comment, and/or assertion is included into the destination code, as in 214. For example, the annotation, expression, comment, and/or assertion may be included in the destination code at a position corresponding to the portion of the code that is to be verified by the verification component using the annotation, expression, comment, and/or assertion.

Upon generation and inclusion of the annotation, expression, comment, and/or assertion in the destination code, or if it is determined that the specification is not compilable into an annotation, expression, comment, and/or assertion that can be utilized by the verification component, a determination is made as to whether the example process is to continue compiling the Dafny code, as in 216. If it is determined that compilation is to continue, the example process 200 returns to block 206 and continues. If compilation is not to continue, the compiled destination code is verified by the verification component, as in 218. For example, the verification component may verify the destination code based on the annotations, expressions, comments, and/or assertions included in the destination code to determine if an error exists in the code that was introduced by the compiler as part of the compilation or to verify that an error does not exist in the destination code.

FIG. 3 is an example Dafny code 310 written in the Dafny programming language.

In the example Dafny code 310, the code includes a module 'Test' 320 that includes a method 321 'foo(input: Map.T)' with a body that defines a variable as 'var v:=input.get("abc")' and a 'match v' 301 case that includes two specifications, in this example types Some and None in the lines: 'case Some(val)=>print String.toUpperCase(val)' 302 and 'case None=>print "Got null from input at \"abc\""' 303.

Because traditional compilers do not utilize the types 302, 303 included in the Dafny code when compiling the Dafny code 310 into a destination programming language, such as Java, the resultant destination code cannot be automatically verified as accurate because it is possible that the compiler introduced an error in the compilation.

For example, and referring to FIG. 4, illustrated is an example code 410 in a destination programming language, in this example Java, resultant from an incorrect compilation of the Dafny code 310 of FIG. 3 using a traditional compiler.

As illustrated in FIG. 4, the compiler that was used to compile the Dafny code 310 to the java code 410 introduced an error because the compiler did not include code generation for 'match v' 301 case of the original Dafny code 310 illustrated in FIG. 3. In the Java code 410 the argument type is indicated as 'String' 407 and is indicated as 'String v=input.get("abc")' 403 in the variable declaration. However, at runtime, the code illustrated in FIG. 4 could result in a null value for v, which would cause the program to fail when trying to call 'null.toUpperCase( )'. For example, in the Java code 410, 'input.get("abc")' will return 'null' if the map contains the mapping "abc"→>'null' or if the mapping does not contain the key "abc" at all.

Because the specifications included in Dafny were not considered or otherwise utilized by the traditional compiler, there is no way to automatically verify or determine the null-pointer error in the destination code 410.

In comparison, FIG. 5 illustrates an example code 510 in the destination programming language, in this example Java, with annotations generated from specifications of the Dafny code 310 of FIG. 3, in accordance with disclosed implementations.

In the example illustrated and discussed with respect to FIG. 5, even though the compiler utilized to compile the Dafny code 310 (FIG. 3) to the destination code 510 still introduced the same error as the traditional compiler that compiled the Java code 410 illustrated in FIG. 4, the additional processing performed in accordance with the disclosed implementations includes annotations of '@Nullable String' 507 rather than 'String' 407 (FIG. 4) in the argument and '@Nullable String v=input.get("abc")' in the declaration 503 rather than 'String v=input.get("abc")' 403 (FIG. 4).

With the addition of the annotations 507, 503, a verification component, such as the Checker Framework, can automatically process the java code 510 and determine that an error was introduced by the compiler during compilation of the Dafny code 410 to the Java code 510. For example, the Checker Framework, upon processing the Java code 510 as part of compilation, would indicate that 'AT' in the Java code 510 may be 'null.' By including the annotations, the Checker Framework can automatically verify the code, or in this example detect an error at compile time so that the Java code 510 does not fail at runtime.

FIG. 6 is another example code 610 in the destination programming language, in this example Java code, with annotations generated from the specifications of the Dafny code of FIG. 3, in accordance with the disclosed implementations.

In comparison to the code illustrated in FIG. 4 and FIG. 5, the code 610 illustrated in FIG. 6 is a proper compilation of the Dafny code 310 (FIG. 3) into the Java programming language with the inclusion of annotations, in accordance with the disclosed implementations. Like the code 510 (FIG. 5), the Java code 610 includes the annotations of '@Nullable String' 607 in the argument and '@Nullable String v=input.get("abc")' in the declaration 603. In addition, the executable portion of the Java code 605 is a correct compilation of the Dafny code 310. In such an example, the annotations introduced by the disclosed implementations are still beneficial because the verification component, such as Checker Framework, can still process the code 610, based on the annotations 607, 603, and verify that the code 610 does not include errors.

FIG. 7 is another example code 710 written in the Dafny programming language.

In this example, the code 710 includes a pre-condition specification 701 "requires key in context," for the method 720 specifying that the method will only be run if the pre-condition specification 701 holds.

FIG. 8 is an example code 810 in the destination programming language, in this example Java, using a traditional compiler to compile the example code 710 (FIG. 7) into the destination programming language.

As illustrated in FIG. 8, using a traditional compiler, the pre-condition specification 701 (FIG. 7) is not considered by the compiler and the resultant destination code 810 does not consider the pre-condition specification. For example, a traditional compiler may compile the method 720 in FIG. 7 to "static boolean getValue(String key, Map<String, Boolean>context) {return context.get(key)" 803. Because the pre-condition specification 701 was not compiled or considered, there is no way to verify that the pre-condition will hold and the example portion 803 of destination code 810 may fail at runtime.

In comparison, FIG. 9 illustrates another example code 910 in the destination programming language, in this example Java, with an assertion 905-1 and an annotation 905-2 generated from the pre-condition specification 701 of the Dafny code 710 of FIG. 7, in accordance with the disclosed implementations.

As illustrated in FIG. 9, the compilation of the pre-condition specification 701 (FIG. 7) by the disclosed implementations results in an assertion 905-1 of "assert context.get(key) !=null:" and the annotation 905-2 of @AssumeAsssertion(nullness)," both of which may be utilized by a verification component to verify that the destination code 910 does not include any errors introduced by the compiler or to determine that the destination code 910 includes an error introduced by the compiler.

Figure 10:
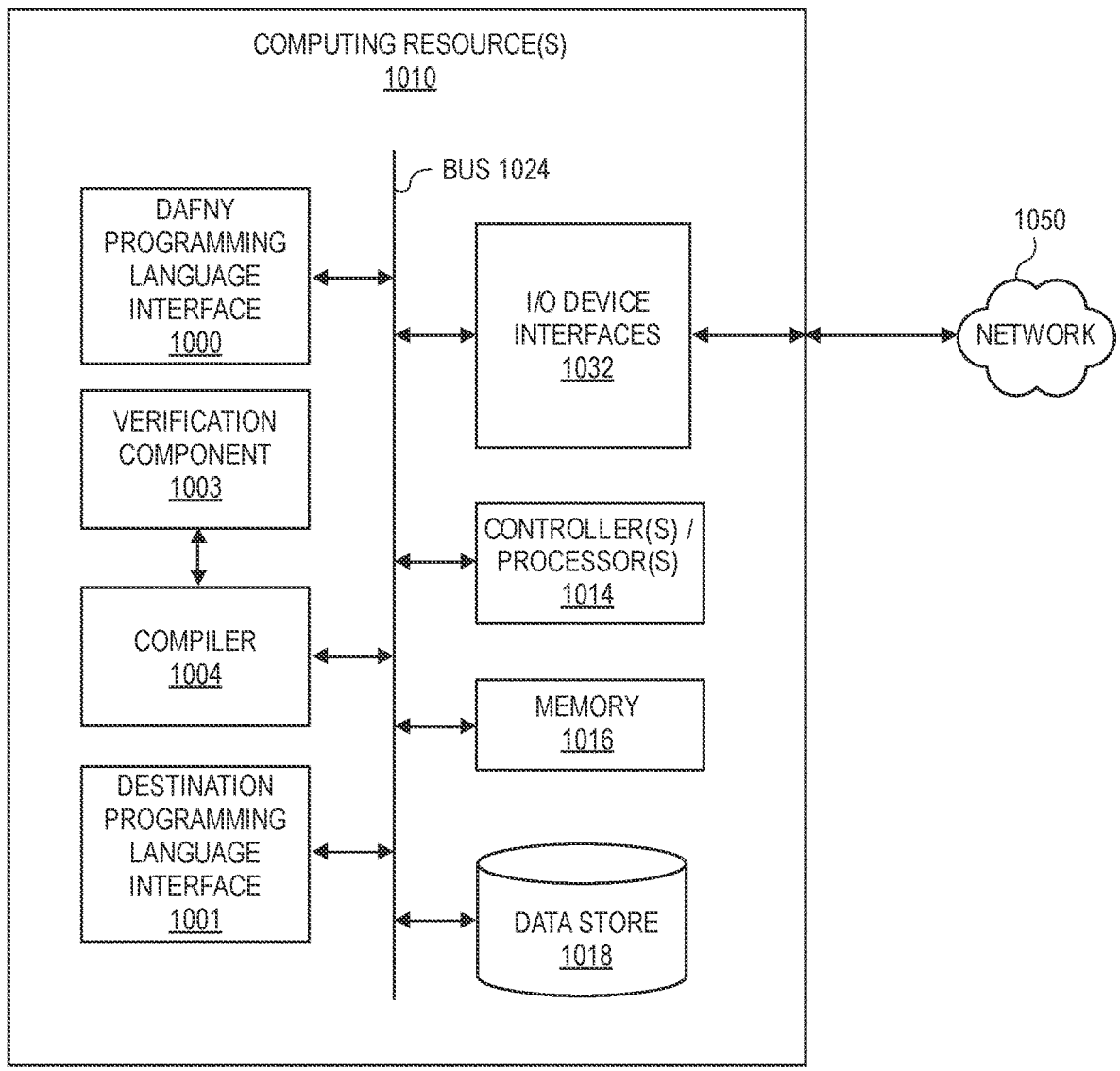
FIG. 10 is a block diagram of an example computing resource, in accordance with disclosed implementations.

FIG. 10 is a block diagram conceptually illustrating example components of computing resource(s) 1010, such as a laptop, desktop, server, or any other type of computing resource, whether local, remote, physical, or virtual, that may be utilized with the disclosed implementations. In some implementations, the disclosed implementations may be implemented across one or more computing resources 1010.

The computing resource(s) 1010 may include one or more controllers/processors 1014, that may each include a central processing unit (CPU) for processing data and computer-readable instructions, and a memory 1016 for storing data and instructions. The memory 1016 may individually include volatile random-access memory (RAM), non-volatile read only memory (ROM), non-volatile magnetoresistive random-access memory (MRAM) and/or other types of memory. The computing resource(s) may also include a data storage component 1018, for storing data, code, executable code, data sets, mappings, libraries, etc. Each data storage component may individually include one or more non-volatile storage types such as magnetic storage, optical storage, solid-state storage, etc. The computing resource(s) 1010 may also be connected to removable or external non-volatile memory and/or storage (such as a removable memory card, memory key drive, networked storage, etc.), internal, and/or external networks 1050 (e.g., the Internet, cellular networks, satellite networks) through respective input/output device interfaces 1032.

Computer instructions for operating the computing resource(s) 1010 and its various components may be executed by the respective computing resource's controller(s)/processor(s) 1014, using the memory 1016 as temporary "working" storage. Computer instructions may be stored in a non-transitory manner in non-volatile memory 1016, storage 1018, and/or an external device(s). Alternatively, some or all of the executable instructions may be embedded in hardware or firmware on the respective device in addition to, or instead of software.

The computing resource(s) 1010 includes input/output device interfaces 1032. A variety of components may be connected through the input/output device interfaces. Additionally, the computing resource(s) 1010 may include an address/data bus 1024 for conveying data among components of the respective computing resource. Each component within a computing resource 1010 may also be directly connected to other components in addition to (or instead of) being connected to other components across the bus 1024.

The computing resources may include a Dafny programming language interface 1000 and/or a destination programming language interface 1001 to allow a programmer accessing the computing resource(s) 1010 to program in the respective language and/or access code written in Dafny and/or a destination programming language. Likewise, the computing resource(s) 1010 may include a compiler 1004 that may compile Dafny code into destination code written in the destination programming language and transform specifications in the Dafny code to annotations in the destination code that may be used by a verification component 1003 to determine any errors in the destination code or verify that the destination code does not include any errors. As noted above, in other implementations, transformation of the specifications in the Dafny code to annotations in the destination code may be performed by a transformation component that is separate from the compiler 1001.

Finally, as discussed herein, the verification component 1003 may interact with the compiler and process the destination code at compile time to identify, based on the annotations included in the destination code, any errors in the destination code or to verify that the destination code is absent of errors.

The components of the computing resource(s) 1010, as illustrated in FIG. 10, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, and computer programming should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIG. 2, orders in which such methods or processes are presented are not intended to be construed as any limitation on the claimed inventions, and any number of the method or process steps or boxes described herein can be omitted as optional or combined in any order and/or in parallel to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A method, comprising:
   initiating, with a compiler, a compiling of a first code written in a Dafny programming language to a second code written in a Java programming language;
   detecting, as part of the compiling, a specification included in the first code;
   compiling the specification into at least one of an annotation that is understandable to a verification component, an expression that is understandable to the verification component, a comment that is understandable to the verification component, or an assertion that is understandable to the verification component;
   including the at least one of the annotation, the expression, the comment, or the assertion in the second code; and
   verifying, with the verification component, the second code, wherein the verification component utilizes the at least one of the annotation, the expression, the comment, or the assertion to verify at least a portion of the second code.

2. The method of claim 1, wherein the verification component is at least one of a Checker Framework, an Open Java Modeling Component ("OpenJML"), or SpotBugs.

3. The method of claim 1, wherein verifying includes at least one of:
   detecting a presence of an error in the second code; or
   verifying an absence of the error in the second code.

4. The method of claim 3, wherein the error is at least one of a null-pointer error, a constant value error, an arithmetic overflow error, an out-of-bounds error, an unsafe signedness operation, an unsafe downcasting operation, a security error, or an invalid regular expression.

5. The method of claim 3, wherein the error is introduced as part of the compilation of the first code written in the Dafny programming language into the second code written in the Java programming language.

6. A computing system, comprising:
   one or more processors; and
   a memory storing program instructions that, when executed by the one or more processors, cause the one or more processors to at least:
      initiate, with a compiler, a compiling of a first code written in a Dafny programming language to a second code written in a destination programming language;
      detect, as part of the compiling, a specification included in the first code;
      compile the specification into at least one of an annotation that is understandable to a verification component, an expression that is understandable to the verification component, a comment that is understandable to the verification component, or an assertion that is understandable to the verification component;
      include the at least one of the annotation, the expression, the comment, or the assertion in the second code; and
      verify, with the verification component, the second code, wherein the verification component utilizes the at least one of the annotation, the expression, the comment, or the assertion to verify at least a portion of the second code.

7. The computing system of claim 6, wherein the destination programming language is at least one of Java, .NET, Go, JavaScript, or C#.

8. The computing system of claim 6, wherein the specification includes a portion of the first code written in the Dafny programming language that is not compilable into an executable code in the destination programming language.

9. The computing system of claim 6, wherein the specification is at least one of a pre-condition, a post-condition, an invariant, an assertion, or a type.

10. The computing system of claim 6, wherein the second code and the at least one of the annotation, the expression, the comment, or the assertion are idiomatic such that the second code and the at least one of the annotation, the expression, the comment, or the assertion can be read by a human or the verification component.

11. The computing system of claim 6, wherein the program instructions, that when executed by the one or more processors to verify the second code, further include instructions, that when executed by the one or more processors, further cause the one or more processors to at least:
    detect a presence of an error in the second code; or
    verify an absence of the error in the second code.

12. The computing system of claim 11, wherein the error is at least one of a null-pointer error, a constant value error, an arithmetic overflow error, an out-of-bounds error, an unsafe signedness operation, an unsafe downcasting operation, a security error, or an invalid regular expression.

13. The computing system of claim 11, wherein the error is introduced as part of the compilation of the first code written in the Dafny programming language into the second code written in a Java programming language.

14. The computing system of claim 6, wherein the verification component is at least one of a Checker Framework, an Open Java Modeling Component ("OpenJML"), or a SpotBugs component.

15. A computer-implemented method, comprising:
    detecting, as part of a compiling of a first code from a first language into a second code written in a second language, a specification included in the first code;
    compiling the specification into a first portion of the second code that is understandable to a verification component; and
    verifying, with the verification component, the second code, wherein the verification component utilizes at least the first portion of the second code to verify whether at least a second portion of the second code includes an error.

16. The computer-implemented method of claim 15, wherein:
    the first portion is at least one of an annotation, an expression, a comment, or an assertion.

17. The computer-implemented method of claim 15, further comprising:
    initiating, with a compiler, the compiling of the first language into the second language;

wherein the first language is Dafny and the second language is Java.

18. The computer-implemented method of claim 15, wherein the specification indicates at least one of a pre-condition, a post-condition, an invariant, an assertion, or a type.

19. The computer-implemented method of claim 15, wherein the error is at least one of a null-pointer error, a constant value error, an arithmetic overflow error, an out-of-bounds error, an unsafe signedness operation, an unsafe downcasting operation, a security error, or an invalid regular expression.

20. The computer-implemented method of claim 15, wherein the verification component is at least one of a Checker Framework, an Open Java Modeling Component ("OpenJML"), or a SpotBugs component.

21. A computer-implemented method, comprising:
compiling at least a portion of a first code written in a Dafny language into a second code written in a second language;
detecting, as part of the compiling, a first portion of the first code;
compiling the first portion into a second portion that is understandable to a verification component; and
verifying, with the verification component, the second code in the second language, wherein the verification component utilizes at least the second portion to verify at least a portion of the second code.

22. The computer-implemented method of claim 21, further comprising:
including the second portion in the second code.

23. The computer-implemented method of claim 21, wherein the first portion is a specification.

\* \* \* \* \*